No. 825,576. PATENTED JULY 10, 1906.
A. F. BECKER.
ELECTRIC FAN.
APPLICATION FILED APR. 12, 1904.
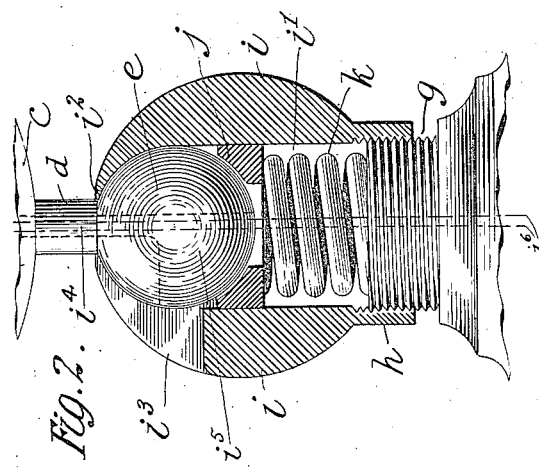
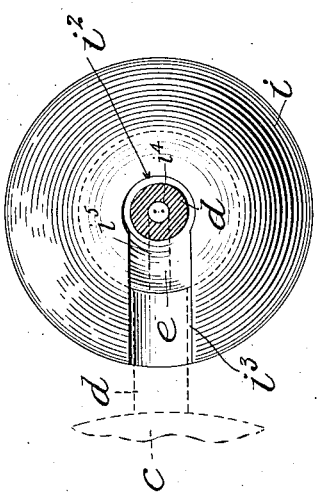
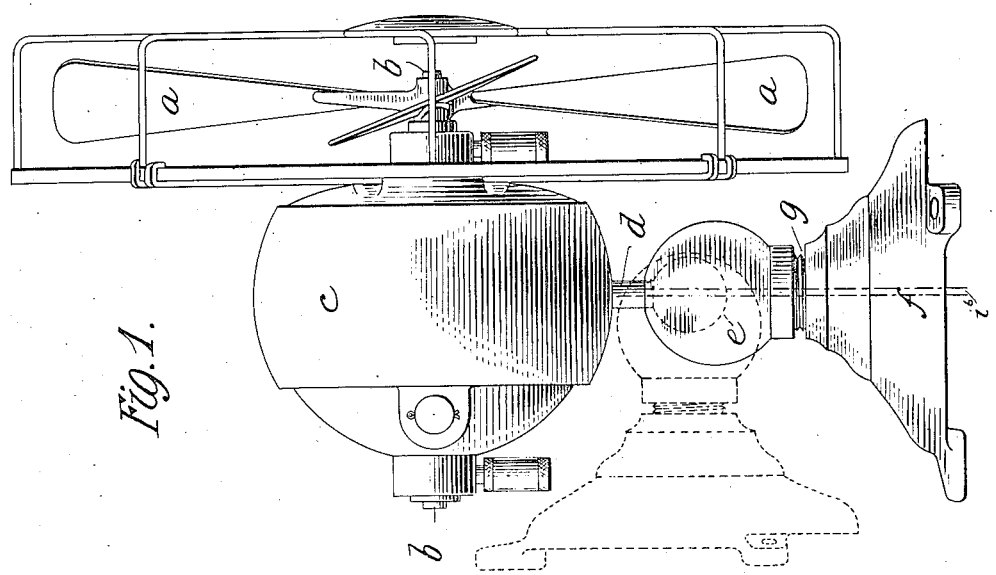
Witnesses
Inventor
Adolph F. Becker,
By his Attorney

UNITED STATES PATENT OFFICE.

ADOLPH F. BECKER, OF ELIZABETH, NEW JERSEY, ASSIGNOR TO DIEHL MANUFACTURING COMPANY, A CORPORATION OF NEW JERSEY.

ELECTRIC FAN.

No. 825,576.   Specification of Letters Patent.   Patented July 10, 1906.

Application filed April 12, 1904. Serial No. 202,832.

*To all whom it may concern:*

Be it known that I, ADOLPH F. BECKER, a citizen of the United States, residing at Elizabeth, in the county of Union and State of New Jersey, have invented certain new and useful Improvements in Electric Fans, of which the following is a specification, reference being had therein to the accompanying drawings.

This invention relates to an improvement in that class of propeller-fans which are designed for use either as desk or wall fans; and it has for its object to provide a simple and effective construction of universal connection between the motor-frame and standard, whereby such members may be made to assume the desired relations without the manipulation of any fastening means, such as clamp-screws and other fastening devices.

The invention consists, primarily, in a fan of the class described having one of its relatively shiftable members provided with a bearing-ball, and the other with a bearing therefor having opposed spring-pressed clamping members, whereby the bearing thus formed not only maintains the ball member in fixed relation to the socket member, but imposes upon the former sufficient friction to resist the gravity of the frame when in inclined position.

The invention further includes certain details of construction herein shown and described.

In the drawings annexed, Figure 1 is an elevation of a fan embodying the present improvement, illustrating the same in full lines adjusted for use as a desk-fan and showing the base member in dotted lines when adjusted for attachment to a side wall. Fig. 2 is a sectional elevation, upon an enlarged scale, illustrating the constructive features of the universal bearing connecting the two fan members, and Fig. 3 is a sectional plan showing in section the shank by which the bearing-ball is attached to the motor-frame.

The motor member comprises the propeller-wheel $a$, carried by the motor-shaft $b$, journaled in the motor-frame $c$, from the lower side of which projects the rigid shank $d$, terminating in the bearing-ball $e$.

The base member or standard comprises the base $f$, provided in its upper portion with threaded boss $g$, to which is fitted the internally-threaded hub $h$ of the socket-piece $i$, with cylindrical socket $i'$, spherically shaped at its upper end to fit and afford a bearing for the upper side of the ball $e$ and provided with an opening $i^2$ to receive the shank $d$. The spherical upper end of the socket $i'$ constitutes the rigid part of a spring-socket for the ball $e$, of which the other part consists of the annular thrust-ring $j$, disposed within and peripherally fitted to the socket $i$, with its upper face recessed to fit the lower spherical portion of the ball $e$, a compression-spring $k$ being interposed between the top of the threaded hub $g$ and the lower side of the thrust-ring for forcing the latter constantly against the bearing-ball $e$, and thereby yieldingly clamping the same between itself and the rigid member of the socket-bearing.

As indicated in dotted lines in Fig. 2, the shank $d$ is tubular in form, and the ball $e$ is formed with an axial connecting-passage $i^4$, terminating in a slot $i^5$ upon one side of its lower portion, whereby the usual flexible conducting-wires $i^6$ or cables may be led from the motor-frame downwardly through the shank $d$, ball $e$, thrust-ring $j$, and spring $k$ into the hollow hub $g$ and base $f$, to the usual switch, which latter is not shown herein, as it forms no part of the present invention. By the employment of a complete spherical knob or ball $e$ I am enabled to secure a uniform bearing-surface for the ball-joint whatever the position which the motor-frame $c$ is caused to assume, thereby insuring the effective operation of the motor-frame support under all conditions, the lateral slot $i^5$ providing for the direct lead of the conducting cord or cable from the motor to the base $f$ in any adjustment of the fan.

From the foregoing description it will be observed that in turning the motor-frame upon its base it is merely necessary to overcome the frictional resistance imposed by the spring-socket bearing upon the ball $e$, while by the provision of the socket-piece $i$ with a lateral slot $i^3$ extending downwardly below the center of curvature of the socket end the base member may be turned up at a right angle to the shank $d$ for attachment of the structure to a side wall, or the two principal members of the fan may be adjusted at any intermediate angle to give the required direction to the air-current produced by operation of the same.

Having thus described the preferred em- bodiment of the present improvement, it is to be understood that the invention is not limited to application to any particular type of fan and that its details of construction may be modified to some extent without departure from the spirit of the invention.

I claim—

An electric fan comprising a motor-frame provided with a shank terminating in a ball, said shank being provided with an axial channel connected at one end with the frame and extending at its other end diametrically through the ball and flared outwardly beyond the center of the latter into a lateral slot, a base having a threaded boss, a socket member provided with an internally-threaded hub fitted to said boss upon the base and having a socket with spherical upper end fitted to said ball and formed with an opening or slot for said shank, a loose thrust-ring within said socket having one side fitted to the lower part of said ball, and a spring within said socket interposed between said thrust-ring and the upper end of said threaded boss.

In testimony whereof I have signed my name to this specification in the presence of two subscribing witnesses.

ADOLPH F. BECKER.

Witnesses:
B. C. KENYON,
H. J. MILLER.